US012190310B2

(12) United States Patent
Suthar

(10) Patent No.: US 12,190,310 B2
(45) Date of Patent: *Jan. 7, 2025

(54) SYSTEMS AND METHODS FOR AUTOMATICALLY CHECKING IN USER AT EVENT VIA E-WALLET TRANSACTION

(71) Applicant: Capital One Services, LLC, McLean, VA (US)

(72) Inventor: Om Suthar, Brambleton, VA (US)

(73) Assignee: Capital One Services, LLC, McLean, VA (US)

(*) Notice: Subject to any disclaimer, the term of this patent is extended or adjusted under 35 U.S.C. 154(b) by 354 days.

This patent is subject to a terminal disclaimer.

(21) Appl. No.: 17/314,209

(22) Filed: May 7, 2021

(65) Prior Publication Data

US 2021/0334786 A1 Oct. 28, 2021

Related U.S. Application Data

(63) Continuation of application No. 16/530,980, filed on Aug. 2, 2019, now Pat. No. 11,030,615.

(51) Int. Cl.
*G06Q 20/36* (2012.01)
*G06Q 10/1093* (2023.01)
*G06Q 20/40* (2012.01)

(52) U.S. Cl.
CPC ......... *G06Q 20/36* (2013.01); *G06Q 10/1095* (2013.01); *G06Q 20/405* (2013.01)

(58) Field of Classification Search
CPC .................................................... G06Q 20/36
See application file for complete search history.

(56) References Cited

U.S. PATENT DOCUMENTS

| 5,557,518 A | 9/1996 | Rosen |
| 10,853,890 B2* | 12/2020 | Hosp ................... G06Q 30/0241 |
| 2012/0124176 A1 | 5/2012 | Curtis et al. |

(Continued)

FOREIGN PATENT DOCUMENTS

| WO | WO-2018145195 A1 * | 8/2018 | .............. G06Q 20/12 |
| WO | WO-2019046829 A1 * | 3/2019 | .......... G06Q 20/3224 |

OTHER PUBLICATIONS

Smart Card Alliance, The Mobile Payments and NFC Landscape: A U.S. Perspective, a Smart Card Alliance Payments Council White Paper Publication Date: Sep. 2011. (Year: 2011).*

*Primary Examiner* — Kurtis Gills
(74) *Attorney, Agent, or Firm* — Foley & Lardner LLP

(57) ABSTRACT

A system for automatically checking in a user device at an event via an e-wallet transaction includes one or more processors configured to schedule the event based on receiving one or more scheduling parameters from the user device, wherein the one or more scheduling parameters include a location of the event; transmit to the user device an event confirmation notification for the scheduled event, wherein the event confirmation notification includes an e-wallet merchandising card; authorize the e-wallet merchandising card transaction upon determining that one or more transaction parameters associated with a request for authorizing an e-wallet merchandising card transaction are each within a threshold value; and automatically checking in the user device at the scheduled event in response to the e-wallet merchandising card transaction being authorized.

20 Claims, 6 Drawing Sheets

(56) References Cited

U.S. PATENT DOCUMENTS

| | | |
|---|---|---|
| 2012/0254419 A1 | 10/2012 | Gilzean et al. |
| 2013/0166332 A1 | 6/2013 | Hammad |
| 2013/0275164 A1 | 10/2013 | Gruber et al. |
| 2014/0058815 A1* | 2/2014 | Hiremath ............. G06Q 20/384 705/14.17 |
| 2014/0155097 A1 | 6/2014 | Tucker |
| 2014/0200997 A1* | 7/2014 | Anderson .......... G06Q 30/0229 705/14.53 |
| 2014/0279503 A1* | 9/2014 | Bertanzetti ........ G06Q 20/3221 705/44 |
| 2015/0006391 A1* | 1/2015 | Agresta ................ G06Q 20/351 705/44 |
| 2016/0098702 A1* | 4/2016 | Marshall ............. G06Q 20/425 705/44 |
| 2016/0148125 A1* | 5/2016 | Paleja ................ G06F 3/04842 705/5 |
| 2016/0162882 A1* | 6/2016 | McClung, III ....... G06Q 20/352 705/41 |
| 2017/0091765 A1* | 3/2017 | Lloyd .................. G06Q 20/321 |
| 2019/0034832 A1 | 1/2019 | Reimer |
| 2019/0188962 A1 | 6/2019 | Higgins et al. |

\* cited by examiner

SYSTEMS AND METHODS FOR AUTOMATICALLY CHECKING IN USER AT EVENT VIA E-WALLET TRANSACTION

CROSS-REFERENCE TO RELATED APPLICATIONS

This application is a continuation of U.S. patent application Ser. No. 16/530,980, filed on Aug. 2, 2019, the disclosure of which is expressly incorporated herein by reference in its entirety.

TECHNICAL FIELD

Embodiments of the present disclosure relate to systems and methods for checking in a customer at an event based on an e-wallet transaction. More particularly, embodiments of the present disclosure relate to utilizing a time, a location, or an amount of the e-wallet transaction, by an event service provider device, to authorize the e-wallet transaction and check-in the customer at the event.

BACKGROUND

Users (e.g., online customers) often schedule an event (e.g., meetings, seminars and conferences) using an online booking system. By way of example, a location of the event (e.g., coffee shop, restaurant, or shopping mall) is selected by the customer during the process of scheduling the event. In a first scenario, because of lack of check-in information available to the customer, upon reaching the location of the event, the customer does not have a clear idea of whom to speak to or where to go or what the process is for checking in for the event. This may cause the customer difficulty in finding and attending their event on time and may degrade the customer experience.

In another scenario, sometime after scheduling of the event, the customer does not attend the event. A common reason for not attending the event may be because the customer forgets the scheduled date or time of the event or simply because the customer has lost interest in attending the event. This may result in a number of no-shows for the event which would be a loss of resources and revenue for the event service provider.

SUMMARY

In accordance with embodiments of the present disclosure, there is provided a system for automatically checking in a user at an event via an e-wallet transaction, the system comprising: one or more memory devices storing instructions; and one or more processors configured to execute the instructions to: schedule an event based on receiving one or more scheduling parameters from a user device, wherein the one or more scheduling parameters include a location of the event; transmit to the user device an event confirmation notification for the scheduled event, wherein the event confirmation notification includes an e-wallet merchandising card; receive, an indication of presentation of the e-wallet merchandising card at a payment terminal as part of an e-wallet merchandising card transaction, wherein the payment terminal is located at the location of the event and the indication includes an identifier associated with the e-wallet merchandising card to authorize the e-wallet merchandising card transaction; authorize the e-wallet merchandising card transaction upon determining that one or more transaction parameters associated with authorizing the e-wallet merchandising card transaction are each within a threshold value; automatically checking in the user device at the scheduled event in response to the e-wallet merchandising card transaction being authorized; and transmit a checked-in notification to an event service provider device indicating that the user device has checked in for the event.

In accordance with embodiments of the present disclosure, there is also provided a computer implemented method for automatically checking in a user at an event via an e-wallet transaction, the method comprising: scheduling an event based on receiving one or more scheduling parameters from a user device, wherein the one or more scheduling parameters include a location of the event; transmitting to the user device an event confirmation notification for the scheduled event, wherein the event confirmation notification includes an e-wallet merchandising card; receiving, an indication of presentation of the e-wallet merchandising card at a payment terminal as part of an e-wallet merchandising card transaction, wherein the payment terminal is located at the location of the event and the indication includes an identifier associated with the e-wallet merchandising card to authorize the e-wallet merchandising card transaction; authorizing the e-wallet merchandising card transaction upon determining that one or more transaction parameters associated with authorizing the e-wallet merchandising card transaction are each within a threshold value; automatically checking in the user device at the scheduled event in response to the e-wallet merchandising card transaction being authorized; and transmitting a checked-in notification to an event service provider device indicating that the user device has checked in for the event.

In accordance with embodiments of the present disclosure, there is further provided a non-transitory computer-readable medium storing instructions executable by one or more processors to perform operations for automatically checking in a user at an event via an e-wallet transaction, the operations comprising: scheduling an event based on receiving one or more scheduling parameters from a user device, wherein the one or more scheduling parameters include a location of the event; transmitting to the user device an event confirmation notification for the scheduled event, wherein the event confirmation notification includes an e-wallet merchandising card; receiving, an indication of presentation of the e-wallet merchandising card at a payment terminal as part of an e-wallet merchandising card transaction, wherein the payment terminal is located at the location of the event and the indication includes an identifier associated with the e-wallet merchandising card to authorize the e-wallet merchandising card transaction; authorizing the e-wallet merchandising card transaction upon determining that one or more transaction parameters associated with authorizing the e-wallet merchandising card transaction are each within a threshold value; automatically checking in the user device at the scheduled event in response to the e-wallet merchandising card transaction being authorized; and transmitting a checked-in notification to an event service provider device indicating that the user device has checked in for the event.

BRIEF DESCRIPTION OF DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

While the following discussion is directed to checking in a customer at an event in a retail or merchant environment, discussion of these services and environments are made by example only. It should be appreciated that the present disclosure is not limited to the specific disclosed embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs. The systems and methods discussed herein may be just as applicable in other environments that may benefit from the ability to determine a customer's location and/or provide notifications/information to the customer.

Figure 1:
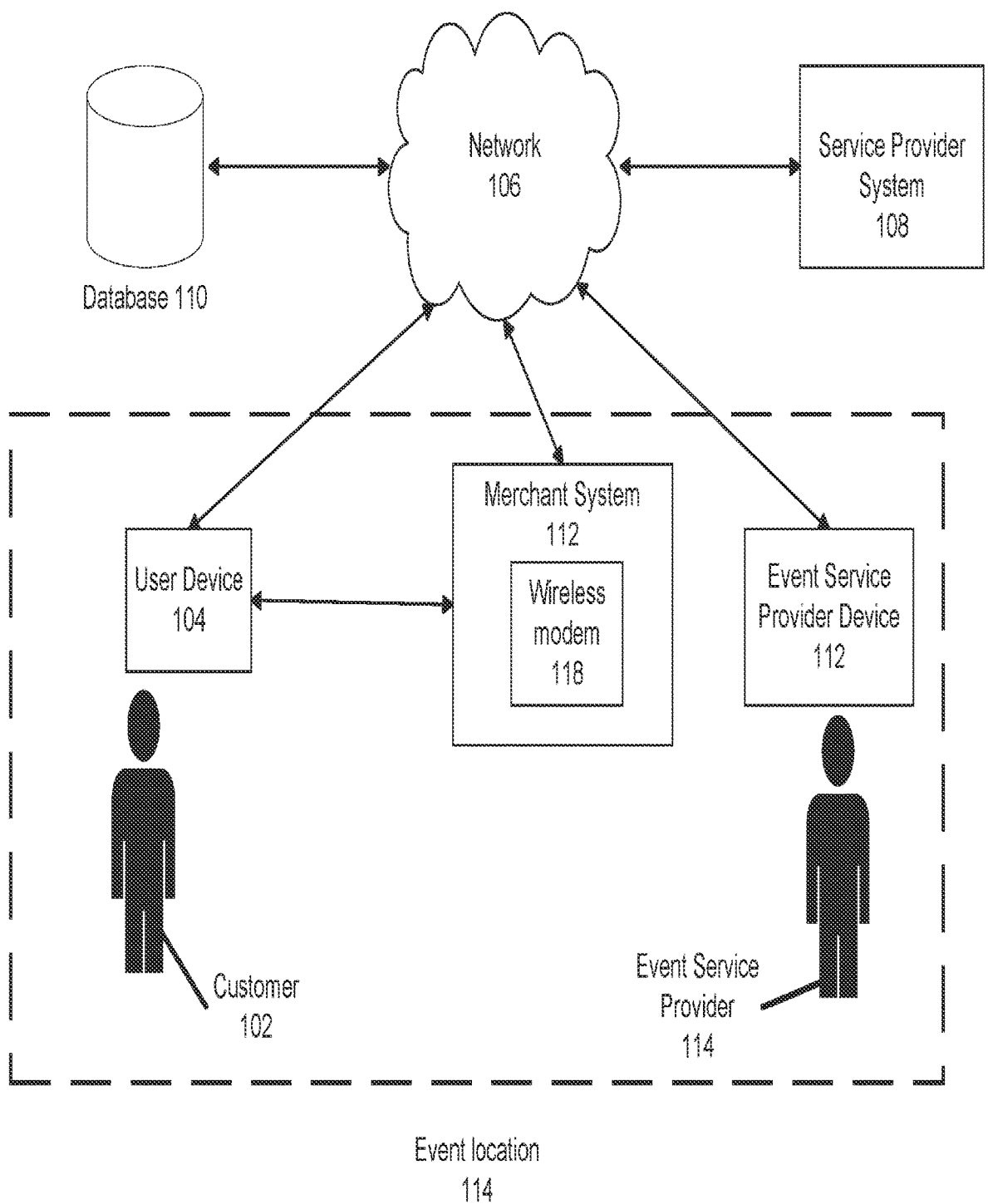
FIG. 1 is a block diagram of an exemplary system, consistent with disclosed embodiments.

FIG. 1 is a block diagram of an exemplary system 100, for performing one or more operations consistent with disclosed embodiments. In some embodiments, system 100 includes one or more user devices 102, one or more service provider systems 104, one or more databases 106, one or more payment terminals 108, one or more event service provider devices 110 and a network 112. Payment terminals 108 may include a wireless modem 116. The components and arrangement of the components included in system 100 may vary. Thus, system 100 may include other components that perform or assist in the performance of one or more processes consistent with the disclosed embodiments.

Components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Aspects of service provider system(s) 104, payment terminal(s) 108, database(s) 106, event service provider device(s) 110 and user device(s) 102 may be configured to communicate with one or more other components of system 100, via network 112, for example. In certain aspects, a customer 114 is associated with and operates user device 102 to interact with one or more components of system 100 to send and receive communications, initiate operations, and/or provide input for one or more operations consistent with the disclosed embodiments.

Components of system 100 may be configured to determine if customer 114 has arrived at an event location 118 within a first predefined time period before an event start time and if customer 114 is within a predefined distance from an event location 118. If these conditions are satisfied, an e-wallet merchandising card redemption notification is transmitted to customer 114. Components of system 100, further determine if a merchandising card redemption transaction initiated by customer 114 occurs within a second a predefined time period before the start time of the event and determines, if the merchandising card redemption transaction occurs within the predefined distance of event location 118. The predefined distance from event location 118 may include, for example, 500 meters from event location 118, or 1 mile from event location 118, although any numerical value and/or metric of distance from event location 118 may be included. Components of system 100 further determine when customer 114 has checked in at event location 118. For example, in some embodiments, aspects of service provider system 108 may be configured to periodically send a location access request to user device 102 associated with customer 114 and receive a response from user device 102 which includes a location of user device 102. The received location may, for example, include real-time GPS coordinates of user device 102.

In some embodiments, aspects of service provider system 104 may be configured to receive a request to initiate an event scheduling session from user device 102. Customer 114 utilizes a user interface displayed on user device 102 to initiate the request for the event scheduling session. Further, the request may include scheduling parameters associated with an event for which customer 114 has registered. The scheduling parameters received by service provider system 104 may be stored in database 106. For example, the scheduling parameters may include event information such as an event identifier, a location of the event, a start time of the event, and an end time of the event. Further, the scheduling parameters may include customer identification information, for example, customer name, and contact details, including for example, email address, telephone number, and residential address, although any other types of parameters associated with the event may be included. Service provider system 104 may be configured to use the identity of customer 114 stored by or accessible to service provider system 104, e.g., in database 106 or user device 102 to determine when customer 114 has checked in for the event. In another example, user device 102 may store the scheduling parameters.

Service provider system 104 may further compile and store the scheduling parameters, e.g., in database 106. The scheduling parameters may further include GPS coordinates of event location 118, geofence coordinates if a geofence is associated with a merchant at event location 118, other map data of the event, hours of operation of a merchant at event location 118, days of operation of a merchant at event location 118, holiday closures, and/or special hours on certain days corresponding to a merchant at event location 118. For example, a merchant may be open on Thanksgiving Day, but closed on Christmas Day.

In some embodiments, service provider system 104 schedules the event for customer 114 upon receiving the scheduling parameters provided by customer 114 and transmits to user device 102 an event confirmation email. Further, the event confirmation email includes a calendar invite that can be stored on user device 102 by customer 114. The calendar invite may be programmed to generate an e-wallet merchandising card redemption notification on user device 102 within a predefined time period before the start of the event. The event confirmation email may also include the e-wallet merchandising card. The e-wallet merchandising card may include any type of virtual gift card that may be stored on user device 102. Types of virtual gift cards may include, a Visa gift card, a Mastercard gift card, a Starbucks gift card, etc. Further, the e-wallet merchandising card may include transaction restrictions. By way of example, the transaction restrictions may include a time frame within which the e-wallet merchandising card can be used, a predefined merchant location at which the e-wallet merchandising card can be used, a distance from event location 118 within which the e-wallet merchandising card can be used, a date on which the e-wallet merchandising card can be used, etc.

Upon the event being scheduled, service provider system 104 activates a first session between user device 102 and service provider system 104. Upon the first session being activated, service provider system 104 generates a first session identifier (SID) associated with the first session and further assigns a unique customer identifier (CID) to customer 114. The CID further identifies the customer 114 as being associated with the first session. Further, service provider system 104 uses the association of the unique CID corresponding to customer 114 of the user device 102 with the first SID corresponding to the first session to determine the scheduling parameters that were received from customer 114 corresponding to the CID, to activate the first session corresponding to the first SID.

Database 106 of system 100, may be communicatively coupled to service provider system 104, event service provider device 110, user device 102, and payment terminal 108 via network 112. Database 106 may include one or more memory devices that store information and are accessed and/or managed by one or more components of system 100. By way of example, database 110 may include Oracle™ databases, Sybase™ databases, or other relational databases or nonrelational databases, such as Hadoop sequence files, HBase, or Cassandra. The databases or other files may include, for example, data and information related to the scheduled events, which may include scheduling parameters, customer identity information, restrictions associated with an e-wallet merchandising card transaction, customer mobility data, and merchant data. Database 106 may include computing components (e.g., database management system, database server, etc.) configured to receive and process requests for data stored in memory devices of database 106 and to provide data from database 106.

Database 106 is configured to store restrictions associated with an e-wallet merchandising card transactions. More particularly, in some embodiments, service provider system 104 is configured to utilize these restrictions associated with e-wallet merchandising card transactions in order to authorize the e-wallet merchandising card transactions, as more fully explained below.

In some embodiments, service provider system 104 updates database 106 with updated scheduling parameters. In other embodiments, customer 114 may reschedule the scheduled event by transmitting, by user device 102, a reschedule event request to service provider system 104. In another embodiment, user device 102 may cancel the scheduled event by transmitting a cancel event request to service provider system 104. The reschedule event request and the cancel event request received from customer 114 of user device 102 includes the CID associated with customer 114 of user device 102. Further, the received reschedule event request includes updated scheduling parameters received from customer 114. Upon receiving the reschedule event request, service provider system 104 updates the previous scheduling parameters associated with the first session corresponding to the CID associated with customer 114. By way of example, when the scheduling parameters associated with the first session include a first event identifier, at a first location of the event, then the updated scheduling parameters received in the rescheduling event request may include a first event identifier at a second location of the event. Service provider system 104 reschedules the event based on the received updated scheduling parameters and terminates the first session with user device 102 and customer 114. Further, service provider system 104 terminates the first SID and activates a second session between user device 102 and service provider system 104. Service provider system 104 assigns a second SID to user device 102. Further, service provider system 104 associates the unique CID corresponding to customer 114 with the second SID to determine the scheduling parameters that were received from customer 114 corresponding to the CID in order to activate the second session corresponding to the second SID. In some embodiments, service provider system 104 schedules the event for customer 114 upon receiving the updated scheduling parameters and transmits to user device 102 a second event confirmation email. The second event confirmation email includes a new e-wallet merchandising card. Upon sending the second event confirmation email, service provider system 104 deactivates the previously transmitted e-wallet merchandising card and provides the new e-wallet merchandising card. The new e-wallet merchandising card includes new transaction restrictions based on the updated scheduling parameters.

Service provider system 104 may be associated with a financial service entity that provides, maintains, manages, or otherwise offers financial services, including financial counselling events. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing or otherwise offering financial services, service provider system 104 may be enabled to authenticate financial transactions associated with a financial service account of customer 114 as well the e-wallet merchandising card. Service provider system 104 may include infrastructure and components that are configured to generate and/or provide financial counselling events to new customers, old customers or future customers, and the like.

In one aspect, service provider system 104 may include one or more computing devices, configured to perform one or more operations consistent with disclosed embodiments. In one aspect, service provider system 104 may include one or more servers or server systems. Service provider system 104 may include one or more processors configured to execute software instructions stored in a memory or other storage device. The one or more processors may be configured to execute the stored software instructions to perform internet-related communication, financial service-based processes, and machine learning for prediction-based notifications. Service provider system 104 may be a computing system configured to collect and store scheduling parameters and schedule events based on the scheduling parameters. The one or more servers or server systems of service provider system 104 may be configured to communicate with other components of system 100 to schedule events. In some embodiments, service provider system 104 may provide one or more mobile applications, web-sites or online portals that are accessible by user device 102 over network 112. The disclosed embodiments are not limited to any configuration of service provider system 104.

Payment terminal 108 may be an entity that offers goods, services, and/or information, such as a retailer, a grocery store, a department store, a restaurant, a shopping mall, a museum, or any other type of entity that offers goods and/or provides services. Payment terminal 108 may include wireless modem 116. Wireless modem 116 may be one or more computing devices configured to perform one or more operations consistent with the disclosed embodiments. In some embodiments, wireless modem 116 may be a wireless access point, wireless router, or any other networking device based on IEEE 802.11 standards. In some embodiments, user device 102 may gain access to network 112 via wireless modem 116. As a result, service provider system 104 may be able to determine a location of customer 114 based on wireless modem 116 associated with merchant system 108, by which user device 102 gains network access. Wireless modem 116 may be a part of merchant system 108 or may be separate from merchant system 108.

Service provider system 104 and user device 102 may be configured to communicate with each other over network 112. Network 112 may comprise any type of computer networking arrangement configured to provide communications or exchange data, or both, between components of system 100. For example, network 112 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Network 106 may also include a public switched telephone network ("PSTN") and/or a wireless cellular network. Network 112 may be a secured network or unsecured network. In some embodiments, one or more components of system 100 may communicate directly through a dedicated communication link(s).

User device 102 may be one or more computing devices configured to perform one or more operations consistent with the disclosed embodiments, as described more fully below in relation to FIG. 2. User device 102 may execute browser or related mobile display software that displays credit-related notifications, including prospective purchase event notifications, on a display included in, or connected to, user device 102. User device 102 may also store and execute other mobile applications that allow customer 114 to select a method by which customer 114 wishes to receive notifications from service provider system 104.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
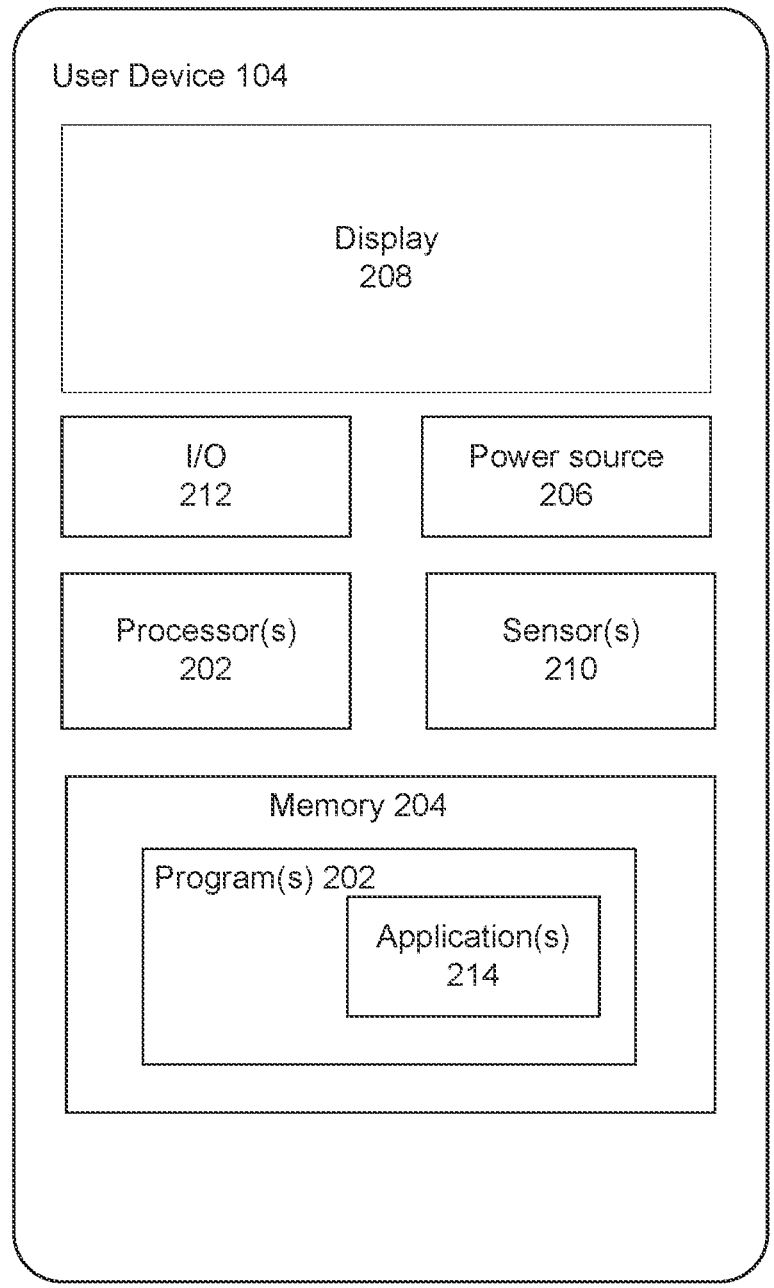
FIG. 2 is a block diagram of an exemplary user device, consistent with disclosed embodiments.

FIG. 2 shows an exemplary configuration of user device 102, consistent with disclosed embodiments. User device 102 may enable a customer 114 to perform remote interactions or mobile transactions with service provider system 104, for example, or receive information from service provider system 104. In some embodiments, user device 102 may be a personal computing device. For example, user device 102 may be a smartphone, a laptop or notebook computer, a tablet, a multifunctional watch, a pair of multifunctional glasses, or any mobile or wearable device with computing ability, or any combination of these computers and/or affiliated components.

User device 102 includes one or more processors 202 configured to execute software instructions stored in memory, such as a memory 204. Memory 204 may store one or more software programs 206 that when executed by processor 202 perform known Internet-related communication, content display processes, and other interactive processes for customer 114 using user device 102. For instance, user device 102 may execute a browser or related mobile display software that generates and displays interfaces including content on a display device 208 included in, or in communication with, user device 102. User device 102 may be a mobile device that executes mobile device applications and/or mobile device communication software, included in programs 206, that allows user device 102 to communicate with service provider system 104 and other components via network 112, to generate and display content in interfaces via display device 208. The disclosed embodiments are not limited to any particular configuration of user device 102. User device 102 may include any arrangement of one or more computing devices configured to perform one or more operations consistent with disclosed embodiments.

User device 102 may be configured to store, in memory 204, one or more operating systems that perform known operating system functions when executed by processor 202. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. User device 102 may also include communication software stored in memory 204 that, when executed by processor 202, provides communications with network 112, such as Web browser software, tablet or smart handheld device networking software, etc.

Display device 208 may include, for example, a liquid crystal displays (LCD), a light emitting diode screens (LED), an organic light emitting diode screen (OLED), a touch screen, and other known display devices. Display device 208 may display various information to customer 114. For example, display device 208 may display an interactive interface to customer 114 enabling customer 114 to operate user device 102 to perform certain aspects of the disclosed methods. Display device 208 may display touchable or selectable options for customer 114 to select and may receive customer selection of options through a touch screen.

User device 102 may include one or more sensors 210, including but not limited to a Global Positioning System (GPS), accelerometers, motion sensors, inertial sensors, other location sensors including Global Navigation Satellite System (GNSS), a gyroscope, pressure sensors, image sensors, proximity sensors, or any other sensors capable of providing three-dimensional location data. The data collected by one or more of sensors 210, including velocity, altitude, elevation, direction of motion in addition to latitude and longitude coordinates, etc., may be used to determine the location of customer 114. In some embodiments, any combination of these sensors may be used to determine a position of user device 102 associated with customer 114 in a three-dimensional environment, including an indoor environment or an outdoor environment. As further explained below, consistent with disclosed embodiments, service provider system 104 determines the customer location from e-wallet merchandising card transaction requests received from user device 102 and utilizes the customer location in determining whether to authorize e-wallet merchandising card transaction requests.

In some embodiments, service provider system 104 periodically requests from user device 102 GPS coordinates of customer 102, determined using one or more of sensors 210. A threshold of how often service provider system 108 requests user device 102 to provide the GPS coordinates of customer 114, may depend on a velocity of customer 114 carrying user device 102. In some embodiments, customer 114 can optionally select continuous monitoring of location. In other embodiments, customer 114 can opt in to allow service provider system 104 to access location of user device 102 at selected hours during the day, on selected days, or at a selected frequency. This customer opt-in feature may enable service provider system 104 to determine a threshold of how often service provider system 108 requests user device 102 to provide the GPS coordinates of customer 114.

In some embodiments, user device 102 uses sensors 210 to generate an elevation profile to determine location in a three-dimensional environment. User device 102 uses one or more of sensors 210 to determine elevation above ground level, typical floor height, etc. Using the determined elevation profile, user device 102 can determine on which floor of a building customer 114 is located.

In some embodiments, user device 102 may be able to determine a motion direction and location of customer 114 in an indoor environment, such as a building. Using one or more sensors 210, user device 102 may determine where customer 114 enters a building and in which direction customer 114 is moving. Service provider system 104 uses the location determined by user device 102 to accurately identify in real time the location of customer 114 using coordinates, motion direction and/or elevation of user device. Service provider system 104 then retrieves from database 106 previously stored information, for example, coordinates, geofence data, other map data, etc., of one or more merchant locations, to determine whether a merchant exists at the identified location. In some embodiments, service provider system 104 may compare the determined location of customer 114 with the coordinates, geofence data, and/or other map data for the list of merchant locations at which user device 102 is permitted to perform e-wallet merchandising card transactions stored in database 106 to determine if customer 114 is at a particular merchant location or at event location 118. In other embodiments, service provider system 104 may compare the mobility data of customer 114 with coordinates, geofence data and/or other map data of merchant locations to make this determination. Using these techniques, service provider system 104 can accurately identify the location of customer 114 and if customer 114 is located at a merchant location and/or at event location 118 along, with the customer specific information, in order to determine if customer 114 has checked in for the event.

In some embodiments, user device 102 can use fingerprint techniques for indoor location determination. A plurality of sensors placed within an indoor space, for example, a building, a mall, etc., can communicate with user device 102. User device 102 can track its movement within the indoor space by interacting with the plurality of sensors. The plurality of sensors placed within the indoor space may be associated with merchant system 108. Service provider system 104 may communicate with merchant system 108 and user device 102 to determine the location of customer 114 associated with user device 102. Service provider system 104 stores the customer location information in database 106 and updates the customer location information based on periodically determining the customer location.

In some embodiments, service provider system 104 utilizes the customer location to determine if user device 102 is within a predefined distance of the location of the event. When service provider system 104 determines that user device 102 is within the predefined distance from the location of the event, then service provider system 104 transmits an e-wallet merchandising card redemption notification to user device 102.

In some embodiments, service provider system 104 can determine that user device 102, associated with customer 114, is traveling, based on the velocity of user device 102. Service provider system 114 may store customer specific information including customer mobility data, for example, customer routine, customer home location, customer work location, customer travel route information, etc. in database 106. Using this travel information, service provider system 104 can further determine whether customer 114 has arrived and is present at a predefined location including but not limited to home, location of the event, office, gym, etc., for a predefined amount of time. For example, if service provider system 104 determines that customer 114 is at home or at work, the likelihood that customer 114 will visit a brick and mortar merchant location is likely very low. Based on this determination, service provider system 104 may then further determine to reduce the frequency of sending location access requests to user device 102 associated with customer 114.

In some embodiments, the frequency at which the location access request is periodically sent by service provider system 104 depends on the determined GPS coordinates of user device 102 associated with customer 114. Customer 114 may optionally connect to wireless modem 116 of merchant system 108. Then, if user device 102 receives a location access request from service provider system 104, user device 102 may provide to service provider system 104, a network address of wireless modem 116 to which user device 102 is connected. Service provider system 104 uses the network address of wireless modem 116 to determine that the location of customer 114 associated with user device 102 is a merchant at the location of merchant system 108. When customer 114 moves from one merchant location to another merchant location, while within a predefined location from event location 118, service provider system 104 can determine the change from the network address of wireless modem 116 and in turn determine the change in location of user device 102. For example, if user device 102 is connected to public Wi-Fi™ of merchant system 108 (e.g., at a coffee shop) at event location 118 and then user device 102 moves to another merchant system (not shown) within the event location 118, service provider system 104 is able to determine the location of customer 114 using the network address of wireless modem 116 associated with merchant system 108 (e.g., coffee shop) and then the network address of a wireless modem (not shown) associated with the another merchant system.

User device 102 includes I/O devices 212 that allow user device 102 to send and receive information or interact with customer 102 or another device. For example, I/O devices 212 may include various input/output devices, such as a keyboard, a mouse-type device, a gesture sensor, an action sensor, a physical button, switch, microphone, touchscreen panel, stylus, etc., that may be manipulated by customer 114 to input information using user device 102. I/O devices 212 may also include an audio output device, such as a speaker configured to provide sound and audio feedback to customer 114 operating user device 102. In some embodiments, I/O devices 212 may include a light emitting component, such as an LED or other component capable of providing a visible signal to customer 114. I/O devices 212 may also include haptic output devices, to provide haptic feedback to customer 114. I/O devices 212 may also include one or more communication modules (not shown) for sending and receiving information from other components in system 100 by, for example, establishing wired or wireless connectivity between user device 102 and network 116. I/O devices 212 may include radio frequency, infrared, or other near-field communication interfaces, for communicating with other devices associated with network 112 or customer 114. Exemplary communication modules of I/O devices 212 may include, for example, a short-range or near field wireless communication modem, a Wi-Fi™ communication modem, or a cellular communication modem. I/O devices 212 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 102 to exchange information with merchant system 108, service provider system 104, or database 106 via network 112.

As described above, user device 102 may be a device that executes mobile applications for performing operations consistent with disclosed embodiments. Thus, in some embodiments, programs 206 stored on user device 102 may include one or more software applications 214 installed thereon, that enable user device 102 to communicate with service provider system 104 via network 112 and perform aspects of the disclosed methods. For example, user device 102 may connect to service provider system 104 by using browser software to access and receive information or perform other operations associated with an internet service provider.

According to an exemplary embodiment, software applications 214 associated with service provider system 104 may be installed on user device 102, as shown in FIG. 2. For example, service provider system 104 may receive a request from user device 102 to download one or more software applications 214 to user device 102. In one embodiment, service provider system 104 may receive the request from customer 114, using a web browser application installed on user device 102. In another embodiment, service provider system 104 may receive the request to download one or more software applications 214 associated with service provider system 104 onto user device 102 from a webpage or another portal associated with service provider system 104 accessed by customer 114 via, e.g., user device 102. In this embodiment, service provider system 104 may store software instructions corresponding to one or more software applications 214 in database 106. For responding to the download request, service provider system 104 may receive additional information from user device 102 regarding the particular device specifications of user device 102 to enable user device 102 to download software instructions corresponding to the particular specifications. Alternatively, service provider system 104 may push a download request link to user device 102 or transmit software code corresponding to one or more software applications 214 directly to user device 102 in, for example, an e-mail, a text or short message service (SMS) message, a prompt through an app, or other suitable method. User device 102 may receive the software code related to one or more software applications 214, such as via network 112, to download and install the software code.

Applications 214 may be used by customer 114 to perform operations consistent with disclosed embodiments. For example, in some embodiments, one of applications 214 generates an event scheduling interface in response to receiving a request to initiate the event scheduling session. The request to initiate the session is created upon customer 114 clicking of an icon to register for the event or open application 214, although any number of techniques could be implemented to initiate a request for scheduling the event.

In some embodiments, upon scheduling the event, the application 214 may enable customer 114 to select a method by which to receive notifications from service provider system 104. More particularly, customer 114 may be able to select a communication channel through which notifications are delivered to customer 114. Application 214 may provide a plurality of channels for delivering notifications or alerts including but not limited to text messages, SMS, phone calls, or an in-app notification, for customer 114 to choose. Customer 114 may be able to choose the method of notification delivery using application 214, including haptic or vibration alerts, sound alerts, silent alerts, etc. Notifications may appear on user device 102 in the form of an icon, a badge on the icon of application 214, a status bar format, or as a more detailed message on display device 208. Customer 114 may be able to choose an appearance of the notification. Once customer 114 selects a channel of notification delivery, customer 114 may further select a method and appearance of notification individually or combination thereof, using application 214. For example, if customer 114 selects only haptic or vibration alerts, user device 102 will vibrate but will neither make any sound nor will it display a detailed message. When customer 114 selects only sound alerts, user device 102 will make a sound, but will neither vibrate nor display a detailed message. Customer 114 may also select vibration and sound alerts together causing user device 102 to vibrate while making a sound to deliver notifications to customer 114. Alternatively, customer 114 may select notifications to be displayed without any sound or vibration alerts with only display of an icon, a badge on the icon of application 214, a status bar, or as a more detailed message depending on the selection by customer 114. Alternatively, customer 114 may be able to select notifications to be delivered using sound alerts, vibration alerts and display messages altogether.

In some embodiments, application 214 may further provide a snooze option to customer 114. Customer 114 may be able to turn the notifications off for a predefined amount of time, if customer 114 does not wish to be disturbed.

Figure 3:
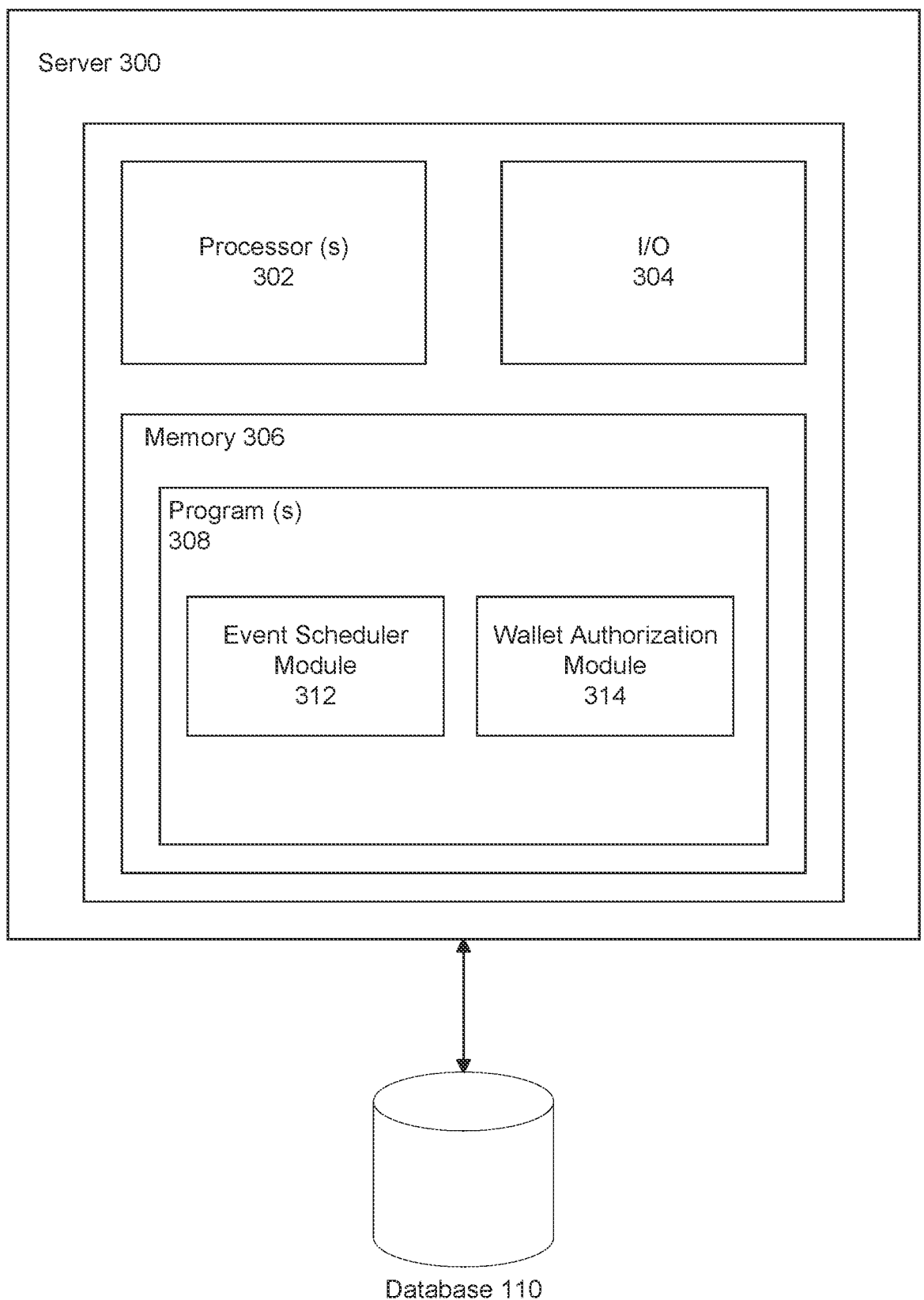
FIG. 3 is a block diagram of an exemplary server system, consistent with disclosed embodiments.

FIG. 3 shows an exemplary server 300 consistent with the disclosed embodiments. Variations of exemplary server 300 may constitute one or more components of service provider system 104 and/or merchant system 108. In one embodiment, server 300 includes one or more processors 302, one or more input/output (I/O) devices 304, and one or more memories 306. In some embodiments, server 300 may be a part of service provider system 104. In some embodiments, server 300 may take the form of a specially programmed server or computing system used by service provider system 104. In some embodiments, server 300 may be configured as an apparatus, embedded system, dedicated circuit, or the like based on the storage, execution, and/or implementation of software instructions that perform one or more operations consistent with the disclosed embodiments.

Processor 302 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

Memory 306 may include one or more storage devices configured to store instructions used by processor 302 to perform functions related to disclosed embodiments. For example, memory 306 may be configured with one or more software instructions, such as program(s) 308 that may perform one or more operations when executed by processor 302. The disclosed embodiments are not limited to separate programs or computers configured to perform dedicated tasks. For example, memory 306 may include a single program 308 that performs the functions of system 300, or program 308 may comprise multiple programs. In certain embodiments, memory 306 may store sets of instructions or programs 308 for determining a location of customer 114, determining if customer 114 is at a merchant location, and providing real-time e-wallet merchandising card redemption notifications based on the location and identity of customer 114. These sets of instructions may be executed by processor 302 to perform communication and/or processes consistent with disclosed embodiments. The programs 308 include an event scheduler module 312 and a wallet authorization module 314.

The e-wallet merchandising card redemption notifications includes an e-wallet merchandising card with a payment identifier. The e-wallet merchandising card redemption notification causes user device 102 to display the payment identifier. The e-wallet merchandising card redemption notification acts as a reminder for customer 114 to redeem the e-wallet merchandising card. The payment identifier is utilized by customer 114 of user device 102 to make a purchase at the merchant associated with payment terminal 108 to redeem the e-wallet merchandising card. The payment identifier includes a barcode or a QR code, although any other type of identifier may be included. Payment terminal 108 may include a barcode scanner or a QR code scanner that scans the payment identifier and initiates an e-wallet merchandising card transaction to redeem the e-wallet merchandising card. Payment terminal 108 further transmits a request to authorize the e-wallet merchandising card transaction to service provider system 104. The payment identifier includes the transaction restrictions associated with the e-wallet merchandising card. By way of example, the transaction restrictions may include a time frame within which the e-wallet merchandising card can be used for a purchase, a predefined location at which the e-wallet merchandising card can be used for a purchase, a predefined distance from event location 118 within which the e-wallet merchandising card can be used for a purchase, a date on which the e-wallet merchandising card can be used for a purchase, a transaction amount associated with the e-wallet merchandising card to which a purchase can be limited, etc.

In some embodiments, the calendar invite received by user 114 in the confirmation email was previously stored by user device 102 as a calendar reminder. The calendar reminder may be programmed to displays the e-wallet merchandising card redemption notification within a predefined time frame before the start of the event.

When service provider system 104 operates as server 300, event scheduler module 312 schedules the event for customer 114 upon receiving the scheduling parameters provided by customer 114, as part of the request to initiate an event scheduling session from user device 102, and further transmits to user device 102 the event confirmation email.

When service provider system 104 operates as server 300, wallet authorization module 314 processes the request to authorize the e-wallet merchandising card transaction. Wallet authorization module 314 receives an indication of presentation of the e-wallet merchandising card at payment terminal 108. The indication includes an identifier associated with the e-wallet merchandising card to authorize the e-wallet merchandising card transaction. The wallet authorization module 314 generates a request to authorize the identifier associated with the e-wallet merchandising card from payment terminal 108. Wallet authorization module 314 determines the transaction restriction requirements associated with the e-wallet merchandising card received in the indication. Based on the determined restriction requirements, wallet authorization module 314 compares the time at which the e-wallet merchandising card was preselected for the transaction, with the restriction requirement of the time frame within which the e-wallet merchandising card could be used for purchase. If wallet authorization module 314 determines that the e-wallet merchandising card was presented for the transaction within a time frame in which the e-wallet merchandising card can be used for the purchase, then wallet authorization module 314 further determines if there are any other restriction requirements associated with the e-wallet merchandising card in the received indication. If wallet authorization module 314 determines that there are no other restriction requirements associated with the e-wallet merchandising card, then wallet authorization module 314 authorizes the e-wallet merchandising card transaction and transmits a successful authorization notification to payment terminal 108. However, if wallet authorization module 314 determines that there is another restriction requirement, for example, of a predefined distance from event location 118 within which the e-wallet merchandising card can be used for a purchase associated with the e-wallet merchandising card received in the authorization request, then the wallet authorization module 314 obtains the current location of user device 102 or obtains the location of payment terminal 108 and compares the location with the restriction requirement of a predefined distance from event location 118 within which the e-wallet merchandising card can be used for a purchase. When wallet authorization module 314 determines that the e-wallet merchandising card was presented for the transaction within a predefined distance from event location 118 in which the e-wallet merchandising card can be used for a purchase, then wallet authorization module 314 further determines if there are any other restriction requirements associated with the e-wallet merchandising card received in the indication. If wallet authorization module 314 determines that there are no other restriction requirements associated with the e-wallet merchandising card received in the indication, then wallet authorization module 314 authorizes the e-wallet merchandising card transaction and transmits a successful authorization notification to payment terminal 108 that indicates the e-wallet merchandising card transaction is authorized.

Event scheduler module 312 automatically checks in, for the scheduled event, customer 114 of user device 102, upon wallet authorization module 314 transmitting the successful authorization notification to payment terminal 108. This is enabled because the determination that the e-wallet merchandising card transaction was successfully authorized, means that customer 114 of user device 102 associated with the scheduled event has arrived at event location 118. Upon automatically checking in customer 114, event scheduler module 312 transmits a checked-in notification to event service provider device 110, indicating that customer 114 of user device 102 has checked in at event location 118. After transmitting the checked-in notification, event scheduler module 312 ends the session between user device 102 and service provider system 104 and further terminates the SID associated with the session.

Server 300 may also be communicatively coupled to one or more database(s) 110. In one aspect, server 300 may include database 110. Alternatively, database 110 may be located remotely from server 300 and server 300 may be communicatively coupled to database 110 through network 106.

Figure 4A:
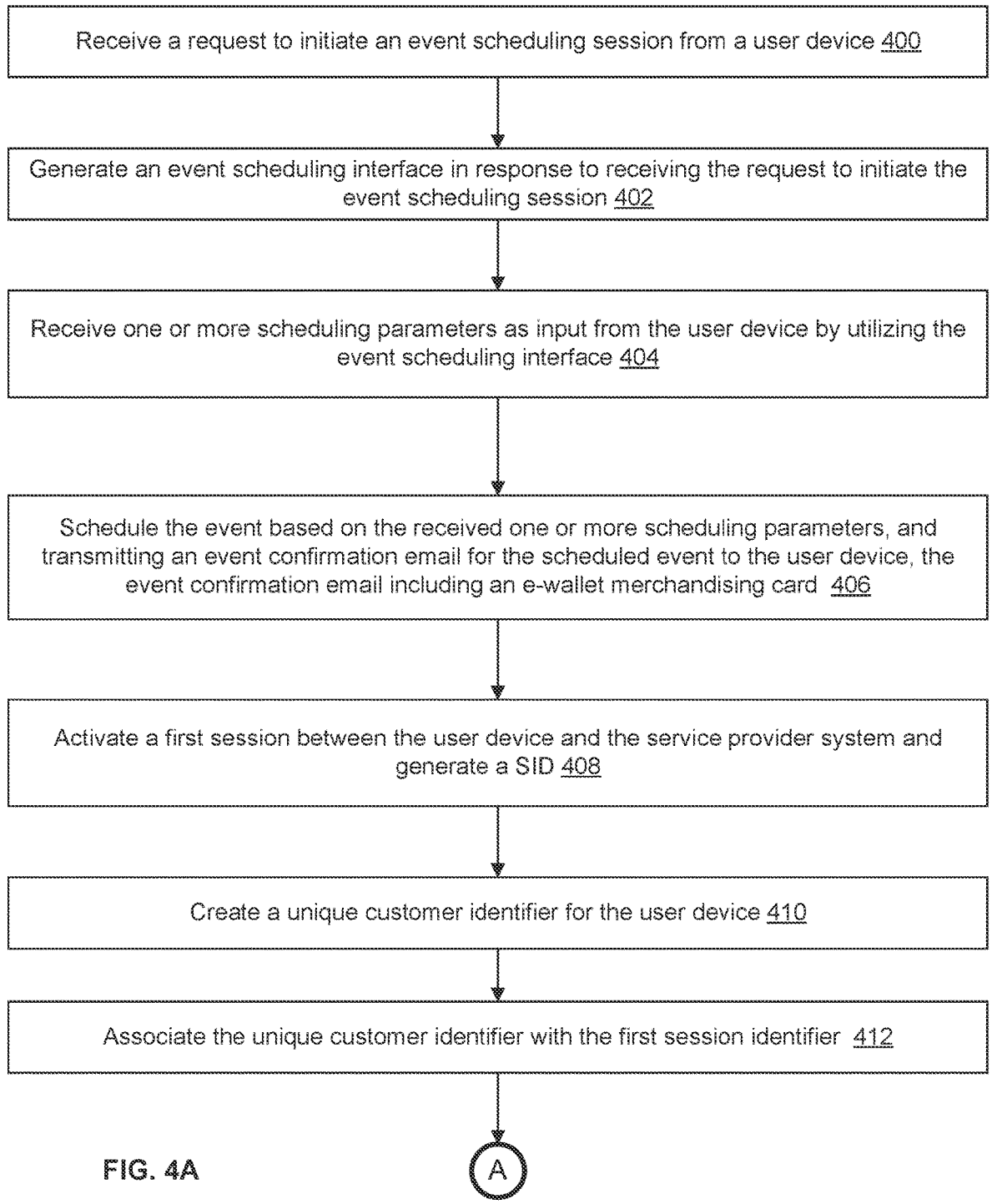
FIGS. 4A-4C contain a flowchart of an exemplary process, consistent with disclosed embodiments.
Figure 4B:
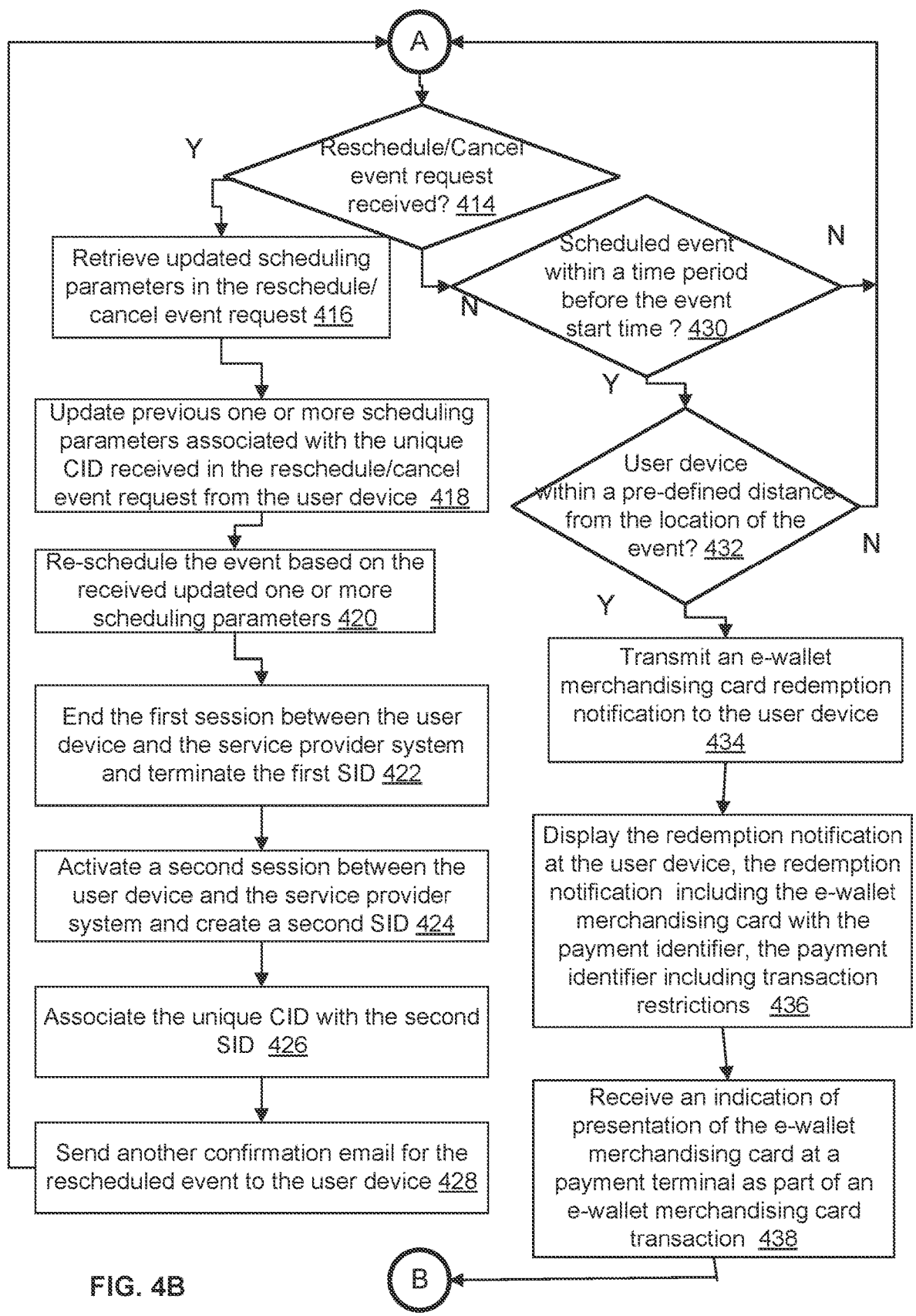
Figure 4C:
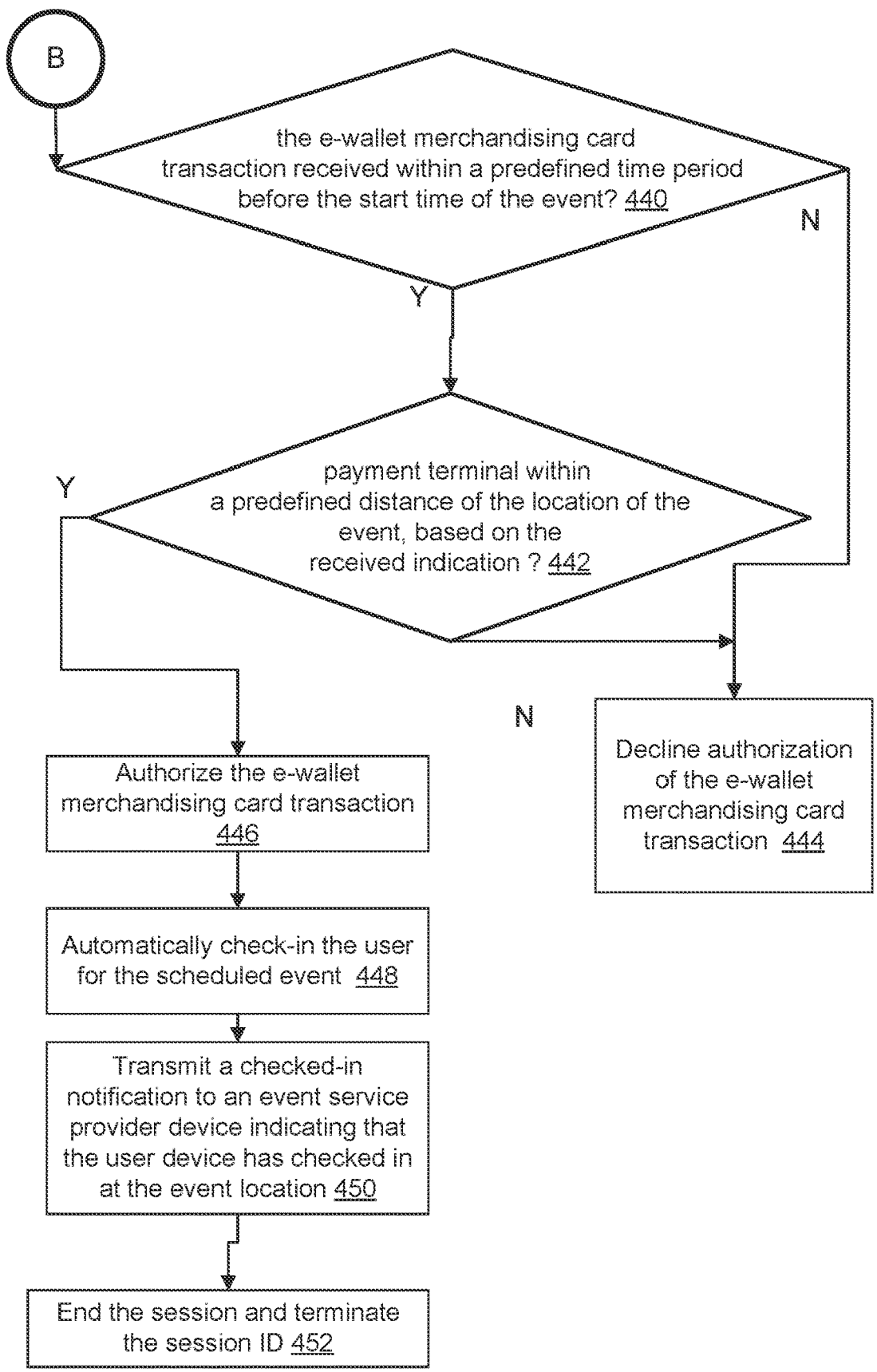

FIGS. 4A-4C are flowcharts of an exemplary process 400 to automatically checking in a user at an event via an e-wallet transaction, consistent with the disclosed embodiments. In certain aspects, server 300 may be configured to execute software instructions that perform one or more of the operations of process 400.

In accordance with process 400, service provider system 104 receives a request to initiate an event scheduling session from user device 102 (400). Customer 114 of the user device 102 may utilize application 214 to transmit the request to initiate the event scheduling session. Service provider system 104 generates an event scheduling interface (not shown in the drawings) in response to receiving the request to initiate the event scheduling session (402). The event scheduling interface is generated by application 214 on display device 208. Customer 114 of user device 102 may utilize the event scheduling interface to transmit the request to initiate the event scheduling session. Service provider system 104 receives a plurality of scheduling parameters as input from user device 102 by utilizing the event scheduling interface (404). For example, the scheduling parameters may include event information including an event identifier, a location of an event, a start time of the event, end time of the event, etc. Service provider system 104 schedules the event based on the received scheduling parameters and transmits an event confirmation email for the scheduled event to user device 102, the event confirmation email including an e-wallet merchandising card (406). Service provider system 104, upon scheduling the event, activates a first session between user device 102 and service provider system 104 and generate a first session ID (SID) (408). Service provider system 108 then creates a unique customer identifier (CID) for user device 102 (410). Service provider system 104 associates the unique CID with the first SID. Service provider system 104 determines if a reschedule event request or a cancel event request is received from user device 102 (414). When service provider system 104 determines that a reschedule event request or a cancel event request is not received (Step 414-No), then process 400 proceeds to step 430.

However, when service provider system 104 determines that a reschedule event request or a cancel event request is received (Step 414—Yes), then process 400 proceeds to step 416. Service provider system 104 receives one or more updated scheduling parameters in the reschedule event request or the cancel event request (416). Service provider system 104 updates previous one or more scheduling parameters associated with the unique CID received in the reschedule event request or the cancel event request from user device 102 (418). Service provider system 104 reschedules the event based on the one or more updated scheduling parameters (420). Service provider system 104 ends the first session between user device 102 and service provider system 104 and terminates the first SID (422). Service provider system 104 activates a second session between user device 102 and service provider system 104 and create a second SID (424). Service provider system 104 associates the unique CID with the second SID (426). Service provider system 104 sends another confirmation email for the rescheduled event to user device 102.

When, after service provider system 104 determines that a reschedule event request or a cancel event request is not received and proceeds to step 430, service provider system 104 determines if the scheduled event is within a predefined time period before the event start time. By way of example, the predefined time period may be 15 minutes before the event start time, although any predefined time period may be used. When service provider system 104 determines that the scheduled event is within the predefined time period before the event start time (Step 430—yes), then service provider system 104 proceeds to step 432. In step 432, service provider system 104 determines when user device 102 is within a predefined distance from the location of the event. By way of example, the predefined distance may be 500 feet, 0.5 miles or 1 mile from event location 118, although any predefined distance may be used. When service provider system 104 determines when user device 102 is within the predefined distance from the location of the event (Step 432—Yes), process 400 proceeds to step 434 where service provider system 104 transmits an e-wallet merchandising card redemption notification.

By way of example, if the event start time is 5:30 PM on Apr. 4, 2019, the predefined time period is 15 minutes before the start time, and user device 102 is within a predefined distance of 0.5 miles from the location of the event, then at 5:15 PM the service provider system 108 transmits an e-wallet merchandising card redemption notification in step 434.

Service provider system 104 causes the redemption notification to be displayed at user device 102, the redemption notification including the e-wallet merchandising card with the payment identifier and the payment identifier including transaction restrictions (436). Customer 114 attempts to use the e-wallet merchandising card at the payment terminal 108 and, in response, service provider system 104 receives a request to authorize the e-wallet merchandising card transaction from payment terminal 108 (438). Service provider system 104 determines if the transaction restrictions associated the e-wallet merchandising card transaction are satisfied. More particularly, service provider system 104 determines if the authorization request for the e-wallet merchandising card transaction is received within a predefined time period before the start time of the event (440). When service provider system 104 determines that the authorization request for the e-wallet merchandising card transaction is not received within the predefined time period before the start time of the event (Step 440—No), then process 400 proceeds to step 444.

When service provider system 104 determines that the authorization request for the e-wallet merchandising card transaction is received within the predefined time period before the start time of the event (Step 440—Yes), then process 400 proceeds to step 442. At step 442, service provider system 104 determines if there are any other transaction restrictions associated with the e-wallet merchandising card transaction. For example, service provider system 104 may determine there is a distance restriction and further determine if the authorization request for the e-wallet merchandising card transaction is received within a predefined distance of the event. When service provider system 104 determines that the authorization request for the e-wallet merchandising card transaction is not received from a location that is within a predefined distance from the location of the event (Step 442—No), then process 400 proceeds to step 444. At step 444, service provider system 104 declines authorization of the e-wallet merchandising card transaction.

When service provider system 108 determines that the authorization request for the e-wallet merchandising card transaction is received within the predefined distance from the location of the event (Step 442—Yes), then process 400 proceeds to step 446. Service provider system 104 authorizes the e-wallet merchandising card transaction (446). Service provider system 104 automatically checks in customer 114 for the scheduled event (448). Service provider system 104, then transmits a checked-in notification to event service provider device 110 indicating to the event service provider 120 that user device 102 has checked in at event location 118 (450). Service provider system 104 ends the session and terminates the SID (452).

In some embodiments, the steps 400-406 may not be performed and instead service provider system 104 may provide to user device 102 an online interactive advertisement, which customer 114 of user device 102 may interact with. The online interactive advertisement may be provided as an email advertisement, an advertisement pops up or as a text message in a short message service (SMS) transmitted to user device 102, although any other type of media may be used to provide the online interactive advertisement to user device 102. The online interactive advertisement may, for example, include the one or more scheduling parameters that have been pre-selected. The online interactive advertisement may prompt customer 114 to attend an event at a specific time and at a specific event location. Customer 114 may indicate an intention to attend the event by, for example, selecting an "Attend" button displayed on the online interactive advertisement to agree to attend the event. In response to customer 114 selecting the "Attend" button or otherwise indicating an intention to attend, service provider system 104 proceeds to step 408 and activates a first session between user device 102 and service provider system 104 upon receiving a response. The method then proceeds from 408-452 as explained above.

The above embodiments disclose benefits for automatically checking in customers at event locations. As described above, customers conduct an e-wallet merchandising card transaction at a merchant terminal and, in response to approval of the transaction, the customer is checked in at the event. Further, the event service provider device is transmitted a notification, indicating that the customer has arrived at the event and has checked in. Since the customers can check in at the event automatically, the customer does not need to worry about looking for event check-in counters or event personnel to check in for the event. The disclosed embodiments provide a solution for problems including but not limited to no-shows for events, long wait times for checking in for events, etc.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The invention claimed is:

1. A system for facilitating automated authorization of an e-wallet card transaction and check-in for an event different from the e-wallet card transaction, the system comprising:
one or more memory devices storing instructions; and
one or more processors configured to execute the instructions to:
in response to receiving, from a user device of a user, a scheduling request for a scheduled event associated with (i) a scheduled event location and (ii) a scheduled event time, generate a session ID (SID) for a session, and associate a unique customer identifier (CID) for a user device with the generated SID, the scheduled event being prescheduled for a user before the scheduled event time;
after the scheduled event is prescheduled for the user, receive an indication that an e-wallet card was presented at a payment terminal as part of the e-wallet card transaction, wherein the indication includes an identifier associated with the e-wallet card to authorize the e-wallet card transaction;
determine, based on a merchant location of the payment terminal, that a transaction location of the e-wallet card transaction is within a predefined distance threshold of the scheduled event location;
determine that a transaction time of the e-wallet card transaction is within a predefined transaction time frame within which the e-wallet card is authorized to be used for a purchase; and
responsive to determining that (i) the transaction location is within the predefined distance threshold and (ii) the transaction time is within the predefined transaction time frame, authorize the e-wallet card transaction; and
responsive to receiving a transaction notification indicating that the e-wallet card transaction was authorized, execute a check-in process related to the session and terminate the generated SID.

2. The system of claim 1, wherein the one or more processors are configured to:
in response to receiving the scheduling request, transmit card information associated with the e-wallet card to the user device.

3. The system of claim 1, wherein the one or more processors are configured to:
receive, via one or more sensors of the user device, location information indicating that the user device is at the merchant location,
wherein the determination that the transaction location is within the predefined distance threshold of the scheduled event location is based on the location information.

4. The system of claim 1, wherein the one or more processors are configured to:
- receive, via one or more sensors of the user device, location information indicating a device location of the user device; and
- transmit a purchase reminder notification associated with the e-wallet card to the user device based on the device location of the location information being within the predefined distance threshold of the scheduled event location.

5. The system of claim 1, wherein executing the check-in process comprises the one or more processors being programmed to:
- transmit a notification indicating a check-in to an event service provider device based on the determination that (i) the transaction location is within the predefined distance threshold of the scheduled event location and (ii) the transaction time is within the predefined transaction time frame.

6. The system of claim 1, wherein the scheduling request comprises one or more scheduling parameters, wherein the one or more processors are further configured to:
- generate and transmit, to the user device, an event confirmation message comprising a calendar invite, wherein the calendar invite is programmed to generate a notification within a predefined time period of a start of the scheduled event.

7. A method comprising:
- receiving, from a user device of a user, a scheduling request for an event associated with an event location and an event time;
- generating, based on the scheduling request, a session identifier for a session associated with the event, the event being scheduled for a user before the event time;
- receiving, subsequent to the event being scheduled for the user, an indication that an e-wallet card was presented at a payment terminal as part of an e-wallet card transaction, wherein the indication includes an identifier associated with the e-wallet card;
- determining, based on a merchant location of the payment terminal, that a transaction location of the e-wallet card transaction is within a predefined distance threshold of the event location;
- determining that a transaction time of the e-wallet card transaction is within a predefined transaction time frame within which the e-wallet card is authorized to be used;
- authorizing the e-wallet card transaction based on (i) the transaction location being within the predefined distance threshold of the event location and (ii) the transaction time being within the predefined transaction time frame; and
- executing a check-in process related to the session based on the e-wallet card transaction being authorized.

8. The method of claim 7, further comprising:
- transmitting, based on the scheduling request, card information associated with the e-wallet card to the user device.

9. The method of claim 7, further comprising:
- receiving, via one or more sensors of a user device, location information indicating that the user device is at the merchant location,
- wherein the determination that the transaction location is within the predefined distance threshold of the event location is based on the location information.

10. The method of claim 7, further comprising:
- receiving, via one or more sensors of a user device, location information indicating a device location of the user device;
- determining that the device location of the location information is within the predefined distance threshold of the event location; and
- transmitting a purchase reminder notification associated with the e-wallet card to the user device based on the determination that the device location is within the predefined distance threshold of the event location.

11. The method of claim 7, wherein executing the check-in process comprises transmitting a notification indicating a check-in to an event service provider device based on the determination that (i) the transaction location is within the predefined distance threshold of the event location and (ii) the transaction time within the predefined transaction time frame.

12. The method of claim 7, wherein the scheduling request comprises one or more scheduling parameters, the method further comprises:
- generating and transmitting, to the user device, an event confirmation message comprising a calendar invite, wherein the calendar invite is programmed to generate a notification within a predefined time period of a start of the event.

13. One or more non-transitory computer-readable media storing instructions that, when executed by one or more processors, cause operations comprising:
- responsive to scheduling, based on a scheduling request received from a user device of a user, an event associated with an event location and an event time, generating a session identifier for a session associated with the event, the event being scheduled for the user before the event time;
- after the event is scheduled for the user, receiving an indication that an e-wallet card was presented at a payment terminal as part of an e-wallet card transaction, wherein the indication includes an identifier associated with the e-wallet card;
- determining, based on a merchant location of the payment terminal, that a transaction location of the e-wallet card transaction is within a predefined distance threshold of the event location;
- determining that a transaction time of the e-wallet card transaction is within a predefined transaction time frame within which the e-wallet card is authorized to be used;
- authorizing the e-wallet card transaction based on (i) the transaction location being within the predefined distance threshold of the event location and (ii) the transaction time being within the predefined transaction time frame; and
- executing a check-in process related to the session based on the e-wallet card transaction being authorized.

14. The one or more non-transitory computer-readable media of claim 13, the operations further comprising:
- transmitting, based on the scheduling request, card information associated with the e-wallet card to the user device.

15. The one or more non-transitory computer-readable media of claim 13, the operations further comprising:
- receiving, via one or more sensors of a user device, location information indicating that the user device is at the merchant location,
- wherein the determination that the transaction location is within the predefined distance threshold of the event location is based on the location information.

16. The one or more non-transitory computer-readable media of claim 13, the operations further comprising:
   receiving, via one or more sensors of a user device, location information indicating a device location of the user device; and
   responsive to determining that the device location of the location information is within the predefined distance threshold of the event location, transmitting a purchase reminder notification associated with the e-wallet card to the user device.

17. The one or more non-transitory computer-readable media of claim 13, wherein executing the check-in process comprises transmitting a notification indicating a check-in to an event service provider device based on the determination that (i) the transaction location is within the predefined distance threshold of the event location and (ii) the transaction time within the predefined transaction time frame.

18. The one or more non-transitory computer-readable media of claim 13, wherein the scheduling request comprises one or more scheduling parameters, the operations further comprises:
   generating and transmitting, to the user device, an event confirmation message comprising a calendar invite, wherein the calendar invite is programmed to generate a notification within a predefined time period of a start of the event.

19. The method of claim 7, further comprising:
   terminating the session identifier based on the check-in process being executed.

20. The one or more non-transitory computer-readable media of claim 13, wherein the operations further comprise:
   responsive to determining that the check-in process was executed, terminating the session identifier.

\* \* \* \* \*